R. H. EDDY.

Suspenders.

No. 5,196. Reissued Dec. 24, 1872.

Witnesses.

S. N. Pifer

J. E. Shaw

Inventor.

Robert Henry Eddy

UNITED STATES PATENT OFFICE.

ROBERT HENRY EDDY, OF BOSTON, MASS., ASSIGNOR TO A. G. EDDY.

IMPROVEMENT IN SUSPENDERS.

Specification forming part of Letters Patent No. 115,722, dated June 6, 1871; reissue No. 5,196, dated December 24, 1872.

*To all whom it may concern:*

Be it known that I, ROBERT HENRY EDDY, of Boston, of the county of Suffolk and State of Massachusetts, have made a new and useful Invention or Improvement in Bretelles or Pantaloon-Suspenders; and do hereby declare the same to be fully described in the following specification and represented in the accompanying drawing, of which—

Figure 1:
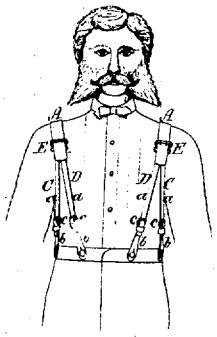
Figure 3:
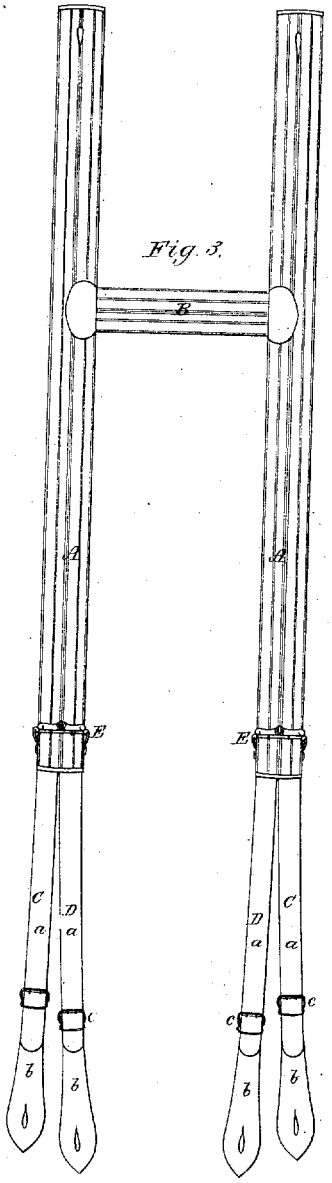
Figure 2:
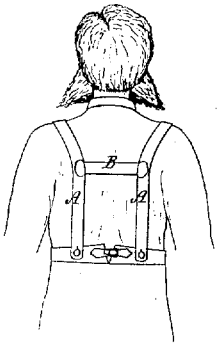

Figure 1 exhibits a front view; Fig. 2, a rear elevation of the improved suspenders as applied to a person, or as they appear when in use; Fig. 3 represents a view of them on a more extended scale.

Most if not all bretelles or suspenders, as ordinarily made and worn, operate to contract the pantaloons of the wearer at the waist—generally much to his discomfort and often to his detriment. The greater the strain on the suspenders the more will they operate to effect such contraction of the waist. They thereby not only obstruct the action of the abdominal muscles, but indirectly that of the lungs and those of the stomach, viscera, arteries, and other internal organs, thereby impeding circulation of the blood and insuring or promoting indigestion. The cause of this contraction of the waist is due to the arrangement of the straps of the suspenders obliquely to the line of draft. When the back straps are crossed or make an angle with each other on the back of the wearer there result diagonal or oblique strains, tending to draw together the back of the waist of the pantaloons. So, when to each main strap there is a pair of front button-straps arranged to stand when in use at or near a right angle to each other, such button-straps, when pulled upward at their junction, draw together or contract that part of the pantaloon-waist which is between them. The tendency of the suspenders so made is also to pull firmly against the abdomen the middle portion of the front part of the waist of the pantaloons, all such operating, as before mentioned, to the discomfort and detriment of the party who may make use of such suspenders.

In making my invention I have sought to produce bretelles or pantaloon-suspenders which, while in use, will not operate, to any material extent, to effect contraction of the waist of the pantaloons. Those hereinafter explained are of such character, and may be worn with great ease and comfort.

The waist of a person's pantaloons while being worn is generally about on a level with the base of the ribs of the wearer. In general it has been customary to have the vertex of each pair of the front button-straps situated at about one third or one-fourth of the distance between the waist and the shoulder, thereby causing the two straps of each pair to stand at an obtuse angle, or about at a right angle to each other.

In my improved suspenders the front button-straps are very much longer than those as heretofore made, they reaching up to or in close proximity with the clavicle or the shoulder-blade; in other words, the vertex of each pair is so situated when the suspenders are in use; the said pair of front straps being united to the back-strap at or in close proximity with the shoulder portion thereof, a buckle being used, if necessary, to effect the union. The back-straps unite near the shoulder-blade portions by a long connection or band, which will cause those parts of the straps which may be below it when in wear to extend downward parallel, or substantially so, or a little divergent as they rise upward, the length of the connection being equal or very nearly equal to the distance between the two rear waist-buttons of the pantaloons. This connection may be in two parts or straps united by a buckle or a lacing, or may be a single elastic or inelastic strap. The main straps I usually make of elastic webbing. Each of the front button-straps, or one at least of each pair of them, I prefer to make of two parts, connected by a buckle; or I otherwise make the strap so that it may be adjustable in length, as may be desirable.

In the drawing the main or back and shoulder straps are shown at A A and their connection at B. The two pairs of front button-straps are represented at C D C D, each pair being extended from a buckle, E, which receives the back and shoulder or main strap. Each of the front buckle-straps C D is shown as composed of two parts or bands, *a b*, united by a buckle, *c*, such a construction of the said buttoning-straps enabling them to be adjusted in length, as occasion may require.

From the above it will be seen that, by having the vertex of each pair of front button-straps at the shoulder or clavicle of the wearer, there will be, on account of the great length of the straps, little if any tendency of their being drawn together by the downward pull of the pantaloons upon them, and consequently little if any contraction of the pantaloon-waist will ensue, and, as there can be no contraction of it by the main straps descending the back, the pantaloons will be suspended from the shoulders of the wearer and maintain, practically speaking, their normal looseness at the waist.

I am aware that it is not new to make suspenders with a back connection, as hereinbefore described, and, therefore, I make no claim to such, irrespective of my specific arrangement of the vertexes of the pairs of front button-hole straps.

By pivoting each pair of front button-straps at the shoulder, or starting the pair from their back-strap, at the shoulder portion thereof, each of the straps of each pair can work independently of the other or fellow strap, and will exert no lateral draft thereon, such as results when the back or shoulder strap descends below the shoulder on its front. One of the front button-hole straps, when the suspenders are in use, descends from the shoulder-strap nearly at a right angle with the waistband of the trousers, and to the button which is situated at or near the middle of the side of the waistband. The other or inner button-strap in its descent from the shoulder diverges from its fellow, and serves simply to sustain the abdominal portion of the pantaloons, the leg and back parts being supported by the back-straps and the outermost of the front button-straps.

By having either or both the front button-straps and the back-strap of each suspender adjustable in length, as described, the suspenders can readily be fitted or adjusted, as occasion may require; and, by having the connection to the two back-straps as described, they, when in use, are kept in their normal or proper positions on the shoulders so as to enable the pairs of front button-straps to operate to the best advantage.

Suspenders constructed on the principle or principles, as hereinbefore explained, may be said, comparatively speaking, to be "anti-waist constrictile."

I claim as my invention as follows, viz:

1. In suspenders, the combination of the adjustable back or shoulder straps and the adjustable front or button straps, all being substantially and to operate as described.

2. Suspenders, substantially as explained, viz., as composed of the back-connection, the adjustable back or shoulder straps, and the adjustable fore or button straps, all being to operate essentially as set forth.

3. Bretelles or pantaloon-suspenders as made with each pair of the front button-hole straps united to or springing from their back or shoulder strap at or in close proximity with the shoulder-bearing portion thereof, whether the union be effected by a buckle or otherwise.

4. Bretelles or pantaloon-suspenders as made with each pair of the front button-hole straps united to or springing from the back or shoulder strap at or in close proximity with the shoulder-bearing portion thereof, and with either or each of the said front button-hole straps of each pair made in two pieces, connected by a buckle or otherwise, so as to be adjustable in length, as occasion may require.

ROBERT HENRY EDDY.

Witnesses:
S. N. PIPER,
J. R. SNOW.